July 26, 1938.　　　　P. E. HAWKINS　　　　2,124,776
VEHICLE BODY
Filed June 7, 1937　　　4 Sheets-Sheet 1

INVENTOR.
PAUL E. HAWKINS.
BY　　　　　　　　ATTORNEY.

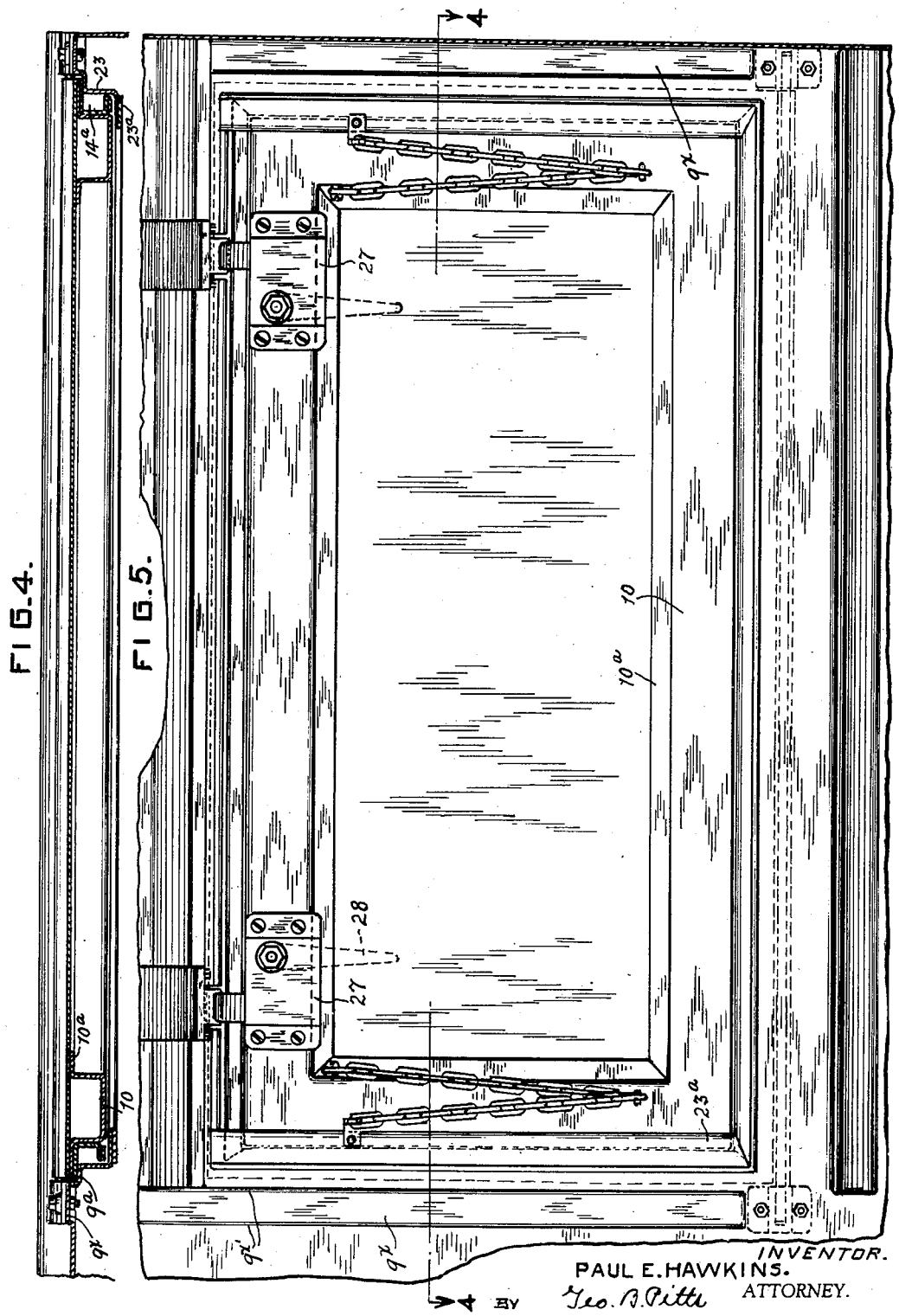

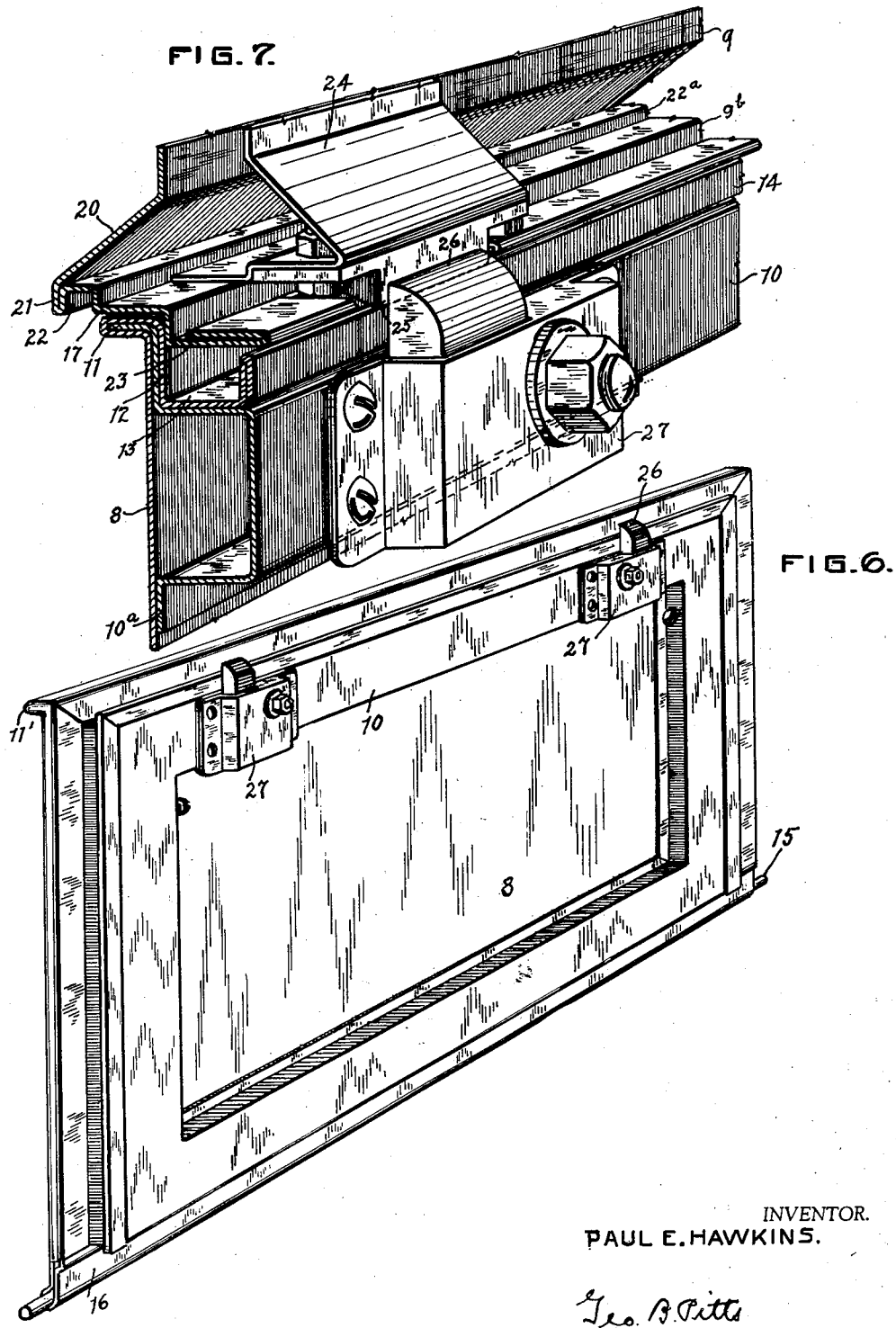

July 26, 1938.　　　P. E. HAWKINS　　　2,124,776
VEHICLE BODY
Filed June 7, 1937　　　4 Sheets-Sheet 4
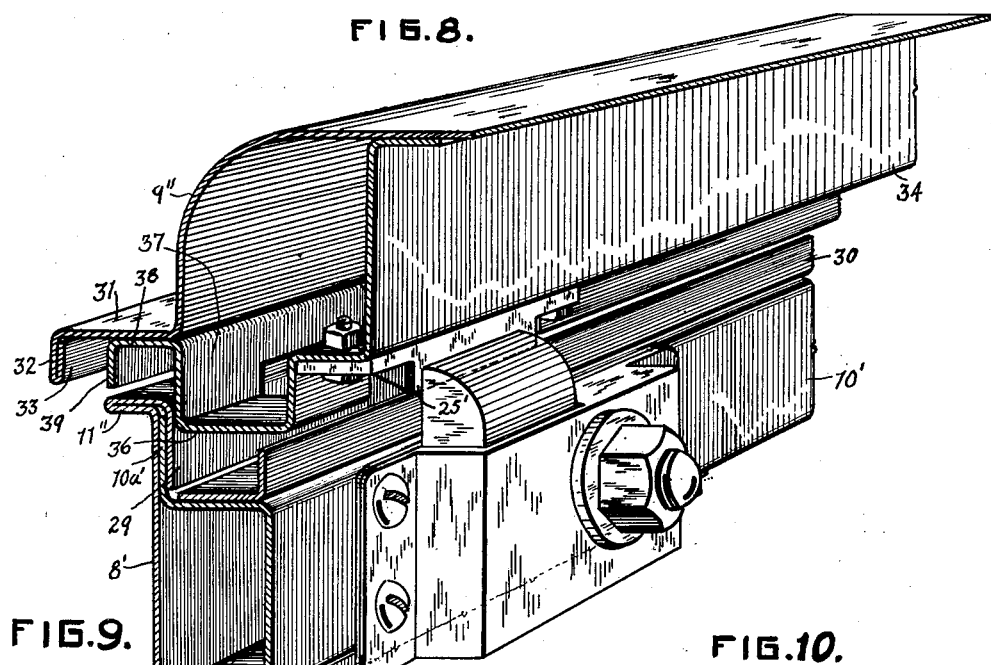
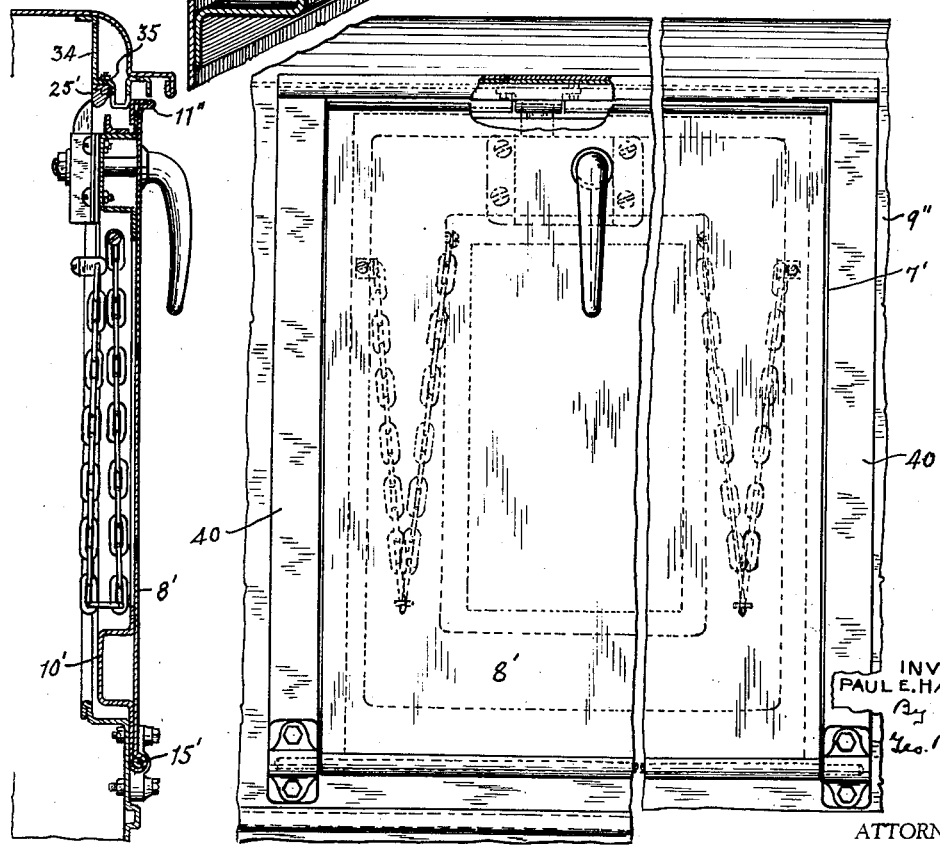
INVENTOR
PAUL E. HAWKINS
ATTORNEY.

Patented July 26, 1938

2,124,776

UNITED STATES PATENT OFFICE 2,124,776

VEHICLE BODY

Paul E. Hawkins, Lakewood, Ohio, assignor to The Baker-Raulang Company, Cleveland, Ohio, a corporation of Ohio Application June 7, 1937, Serial No. 146,882

16 Claims. (Cl. 296—44)

This invention relates to a vehicle, more particularly a vehicle body having one or more compartments accessible from the outside thereof and doors or closures for the compartments. The invention is particularly applicable to vehicles of the utility type, wherein are stored various equipment, accessories, fittings capable of being affected and damaged by water or moisture, so that it becomes necessary and advantageous to provide a construction wherein danger of water entering the compartments is eliminated. These vehicles are subject to weather conditions daily and in many instances are washed each night by the use of water or a washing solution, usually applied under pressure.

One object of the invention is to provide an improved vehicle body having a compartment and a door therefor on its outer side wall, wherein means are provided exteriorly of the door and its opening to baffle away from such opening water directed against the body and door and a trough is provided interiorly of the door to collect any water leaking through the door opening.

Another object of the invention is to provide an improved vehicle body having a compartment in its side portion and a door therefor, wherein a collecting trough is provided interiorly of the door along its top and ends and the wall forming the door opening is provided interiorly with a baffle which extends across the open side of the trough.

Another object of the invention is to provide an improved vehicle body having an accessible outer compartment wherein the inner side of the door is provided along its top and ends with a trough and the inner side of the compartment wall along the bottom of the door opening is provided with a receiving trough in connected relation with the trough on the door.

Another object of the invention is to provide for a vehicle body having one or more compartments on or incorporated in one or both of its side walls and doors for the compartments, an improved shield or guard on the outer side wall of the body above certain of the doors to prevent intake into the adjacent compartments water impelled against or gravitating down the body side walls.

Other objects of the invention will be apparent to those skilled in the art to which my invention relates from the following description taken in connection with the accompanying drawings, wherein Fig. 1 is a side view of a vehicle having a body embodying my invention.

Fig. 4 is a section on the line 4—4 of Fig 5.

Fig. 5 is a view of parts shown in Fig 2 looking towards the right.

Fig. 6 is a perspective view of a door.

Fig. 7 is a fragmentary perspective view of parts shown in Fig. 6, enlarged.

Fig. 8 is a fragmentary side elevation similar to Fig. 7, but showing a modified form of construction.

Fig. 9 is a fragmentary section through the parts shown in Fig. 8 corresponding to that portion of the body indicated by the line 2—2 of Fig. 1.

Fig. 10 is a fragmentary perspective view enlarged.

Figure 1:
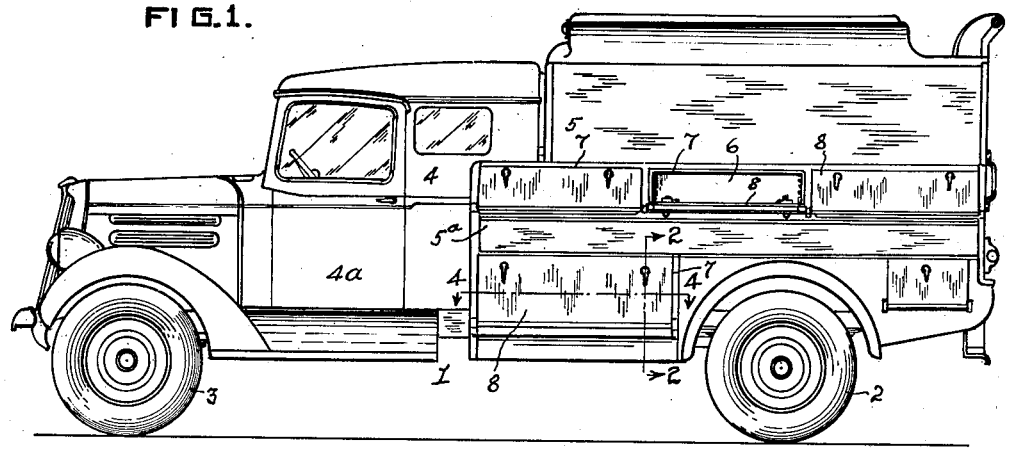
Figures 2, 3:
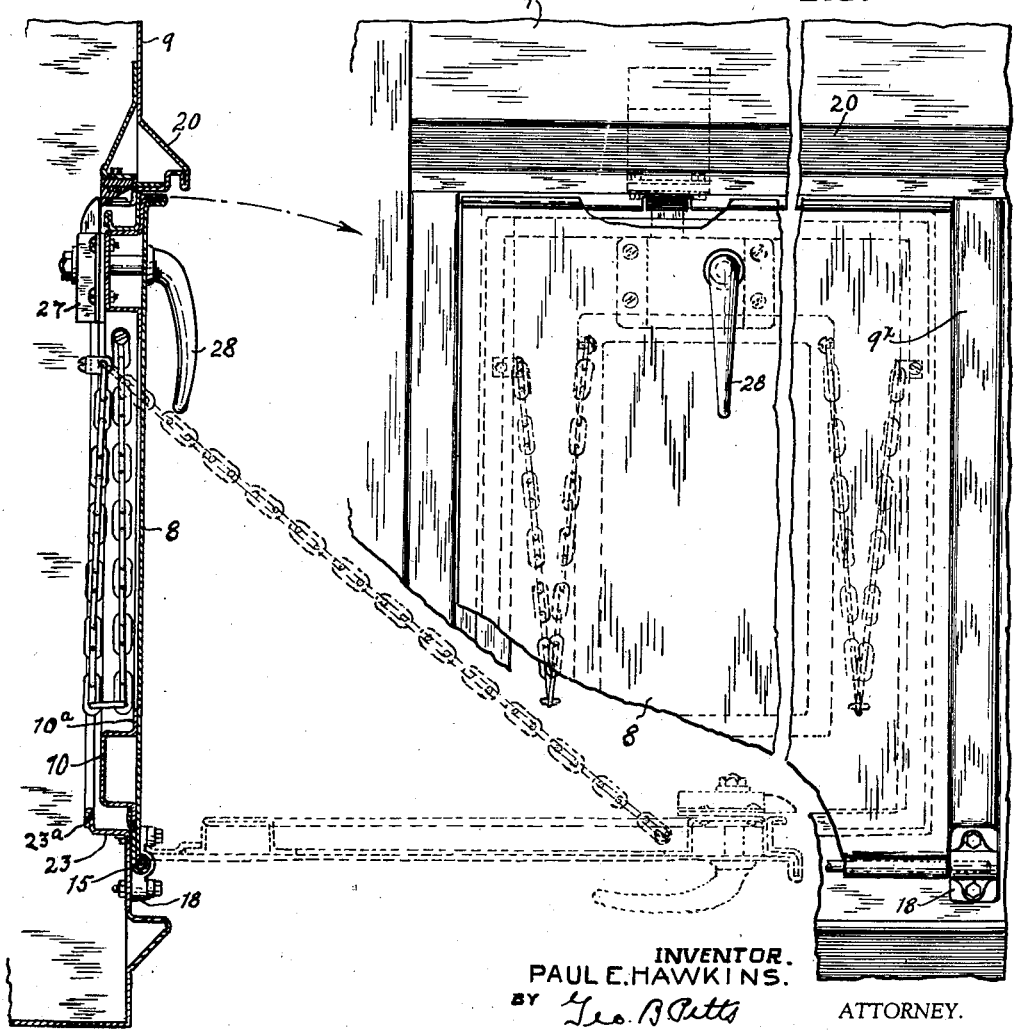
Fig. 2 is a fragmentary section on the line 2—2 of Fig. 1.
Fig. 3 is a fragmentary side view of the vehicle body, enlarged.

In the drawings, 1 indicates a vehicle of the utility type having driving wheels 2, steerable wheels 3 and a driver's station 4, the latter preferably consisting of a cab having a door 4a; each of these parts may be of any desired construction. Rearward of the cab 4, I provide a body indicated as an entirety at 5, which, in general construction and arrangement, is substantially similar to the body shown in my co-pending application Serial No. 2,554, filed January 19, 1935; but has incorporated in it certain improvements hereinafter specifically referred to. The body, as will be understood by reference to my aforesaid application, consists of side members 5a and a roof, each side member 5a along its lower portion providing a plurality of compartments (one being shown at 6 in Fig. 1), the outer wall of the side member being formed with openings 7 leading into said compartments and each opening being provided with a hinged door or closure 8. The outer wall 9 of each side member 5a (and by preference all the walls thereof) and doors 8 are formed of sheet metal. As the door 8 for each compartment and the wall sections of the outer wall 9 which are related to the door and form the opening into the adjacent compartment, are similar in construction, the door 8 for one compartment 6 and the wall sections co-operatively related thereto only are shown in Figs. 2 to 7, inclusive. Referring to these figures, 10 indicates a reinforcement for the door 8 mounted on its inner wall and extending parallelly along its sides and ends but spaced therefrom. The reinforcement preferably consists of a continuous hollow sheet metal member having along its inner and outer sides flanges 10a spot welded to the door wall. The outer flange 10a of the reinforcement along the top edge of the door may be extended and bent laterally outwardly as shown at 11 (Fig. 7) and the door wall is extended so as to be bent around the extension 11, in face to face relation therewith, then inwardly in face to face relation with the adjacent flange 10a as shown at 12, then laterally away from the door in face to face relation with the outer side wall of the reinforcement as shown at 13, and finally bent at right angles away from the reinforcement and substantially parallel to the wall portion 12 as shown at 14, the latter wall portion being doubled back on itself to reinforce or stiffen such wall portion as well as to eliminate a rough terminating edge. This form of construction is provided along the top of the door; whereas along its bottom and ends the door wall is bent back on the adjacent flange 10a and along the bottom of the door the door wall surrounds a rod 15 as shown at 16 (Fig. 6). In this arrangement (1) the door is provided along its top edge with an outwardly extending baffle wall, at right angles to the door, to divert water impelled thereagainst away from the door opening, (2) the marginal edges of the door are made substantially rigid, (3) a wide jamb wall is provided along the top edge of the door to co-act with a similar wall, indicated at 17, on the body side wall 9 and (4) the wall portions 12, 13 and 14 form a trough along the top and ends of the door for a purpose later set forth.

The rod 15 extends beyond the opposite ends of the door and rotates in bearings formed in stampings 18, which are preferably riveted to the outer wall 9 of the body, whereby the door may be swung to its open position.

The wall 9 along either side of the compartment opening 7 is formed with an inwardly disposed off-set 9a and along the top of the opening I provide a wall 9b, as later set forth, bent inwardly at substantially right angles to the adjacent jamb wall 17 substantially in alinement with the off-sets 9a. The off-sets and wall 9b form seats for the door when the latter is closed and latched, to dispose it substantially in the plane of the adjacent portions of the wall 9. Along the wall 9 at and adjacent the opposite ends of the door, I provide guard devices 9x which protect the space or crack between the door ends and walls of the opening related thereto, from the rain, particularly when the rain impinges on the body at an angle; for example, when the vehicle is in motion. These devices 9x may consist of flat metal strips suitably fixed to the wall 9 with their inner edges in close relation to the door ends; but by preference, as shown, these devices are provided by embossing the wall 9 outwardly along and between parallel lines 9x' for a distance at least equal to the vertical heigth of the door, the inner side wall of each embossment being alined with and forming a continuation of the side wall of the adjacent off-set 9a (see Fig. 4).

Above the door 8, the side wall 9 is bent outwardly at an inclined angle as shown at 20 to form a guard and then downwardly as shown at 21. The wall 9 is then embossed to form an inverted channel 22 and extended inwardly from the inner side wall 22a of the channel to form the jamb wall 17 (already referred to). The terminating edge of the wall 21 is spaced from and disposed in the plane of the adjacent jamb wall 17; whereas the wall 22a is disposed adjacent to the edge of the wall 11. The inclined wall 20 serves to divert water flowing down or falling on the outer wall 9 of the body away from the door opening. By spacing the terminating edge 21 from the door opening danger of any water flowing into and through the opening by capillary attraction is eliminated. If the gap or channel 22 was omitted and the wall 21 was connected with the jamb 17, such connecting wall would conduct water into the door opening and during the washing operation it would serve as a guide or flow wall and direct the water into the opening. In my form of construction, I provide adjacent the meeting edges of the door and its opening a vertical wall 22a which baffles the water away from these edges, so that only that portion of the water impelled by the supplied device (nozzle or the like) that happens to fall in between the meeting edges can find its way through the opening into the collecting trough, since the surfaces of the door and body wall adjacent to these edges serve to baffle the water away therefrom. Accordingly, the compartment opening along the top of the door is adequately guarded or protected from the elements. At the inner edges of the jamb wall 17 the wall 9 is bent downwardly to form the seat 9b for the door 8, when the latter is closed, as above set forth. The wall 9 is also extended laterally inwardly from the wall 9b and off-sets 9a, as well as along the bottom of the opening 7, to form a baffle 23 related to the open side of the trough formed by the walls 12, 13 and 14, from end to end thereof. As shown the baffle 23 lies over and extends inwardly beyond the adjacent walls 14 carried by the door, and along the sides and bottom of the opening, the baffle 23 is bent laterally into substantially a parallel relation to the door, as shown at 23a, the terminating portion of the wall forming the baffles 23 and 23a being bent back on itself to eliminate a rough terminating edge. In this arrangement (a) the wall 23a lies behind the wall 14 along the ends of the door, to prevent water from splashing from the trough into the adjacent compartment; and (b) along the bottom of the opening the walls 23 and 23a form a collecting trough for water flowing downwardly through the trough 14a to contain it while escaping through the spaces associated with the door hinges.

24 indicates sheet metal plates of substantially V-shape, the ends of each of which are suitably secured to the walls 9 and 17 (see Fig. 7). The lower portion of each plate 24 has bolted to it a keeper 25 to engage a latch 26, movably mounted in a casing 27. The casings 27 are mounted on the reinforcement 10. Each latch is operatively connected to the shank of a handle 28, whereby the latch may be retracted and disengaged from the adjacent keeper.

It will be noted that in this form of construction the top of the door is provided with a relatively wide wall 11 which extends outwardly relatively to the face of the door and is closely related to a relatively wide jamb 17 forming the top of the door opening 7. It will also be noted that along the top and ends of the door I provide a collecting trough closed by a baffle, which is carried by the body wall and extends over and beyond the inner side wall of the trough, and that this trough is arranged adjacent to the off-set walls 9a and wall 9b so that these walls may direct any water leaking through the opening into the trough. By extending the door wall back on itself and utilizing the extended portion thereof to form the trough 14a (or at least the outer wall of the trough) all water leaking through the opening must flow into the trough, where it can be guided to points of discharge. Along the sides of the door opening the baffle extends laterally behind and overlaps the inner side wall of the trough. The purpose of the trough formed by the walls 12, 13, 14 is to collect any water which may find its way through the door opening when the door is closed and permit it to drain along the trough and gravitate therethrough at either side of the door to the lower edge of the latter, where it may be discharged through the spaces surrounding and adjacent the hinge rod 15. The baffle wall 23 prevents any such intake of water from splashing into the adjacent compartment.

Figs. 8, 9 and 10 illustrate a modified form of construction. In these views, 8' indicates a door hinged at its lower end on a hinged rod 15'. 10' indicates a reinforcement extending along the top, ends and bottom of the door, on the inner side thereof. In this form of construction, the door wall is bent back on itself along its top, ends and bottom, as already described in connection with Figs. 1 to 7, but such bent back portions terminate on the inner side of the outer flange 10a' of the reinforcement as shown at 29 (Fig. 10), the outer flange 10a' terminates along the top edge of the door and a separate sheet metal strip 30 of angle shape is provided on the outer side wall of the reinforcement along the top and ends of the door to co-operate with the wall 29 to form the trough. In this arrangement the upper edge of the door is provided with an outwardly extending wall 11" forming a baffle. The outer wall 9 of the body above the door opening 7' is extended laterally outwardly, as shown at 31 and bent downwardly as shown at 32 and then bent back on itself, at 33, to eliminate a rough edge; also a separate sheet metal wall 34 is provided on and suitably secured along one marginal portion to the inner side of the wall 9 and is extended to form a support 35 for the keepers 25' (only one being shown), a section 36 which bridges the trough between the walls 29—30, a vertical section 37 to form a seat for the adjacent door edge, a section 38 disposed below and secured to the wall 31 and a depending section 39 related to the free edge of the baffle 11" and spaced from the wall 32 to form therewith a channel above and related to the adjacent edges of the wall section 39 and baffle 11". The walls 11" and 39 are arranged to direct water impelled against them away from the door edge which is exposed.

40 indicates guard devices secured to the body wall 9" and extending along and adjacent the opposite ends of the door to protect the space or crack between such ends and the side walls of the door opening. The devices 40 preferably comprise flat metal strips suitably secured to the wall 9".

The body wall 9 along the ends and bottom of the door 8' and the corresponding portions of the door are similar in construction and arrangement to like parts shown in Figs. 1 to 7, inclusive.

It will be noted that in each of the forms of construction illustrated I provide along the top edge of the door a laterally, outwardly extending baffle to direct water away from the door edge and in co-operative relation thereto, on the body wall, an inverted channel, the inner wall of which also directs the supplied water away from the door edge, the channel serving to collect the water and permitting it to gravitate downwardly without danger of the water getting into the compartment.

It will also be noted that the construction of the door and body is such that a minimum amount of water can find access between and through the related edges of the door and body, even when the operation of washing the body is being carried out and that provision is made to collect such intake of water and guide or convey it to a point where it can find points of discharge. Accordingly, the construction serves to protect the materials, parts and equipment stored in the compartment.

To those skilled in the art to which my invention relates many changes in construction and widely differing embodiments and applications of the invention will suggest themselves without departing from the spirit and scope thereof. My disclosures and the description herein are purely illustrative and not intended to be in any sense limiting.

What I claim is:

1. In a body for a vehicle having a side portion, the combination with a compartment incorporated in said side portion, the outer wall of the side portion being formed with an opening leading into said compartment and a door for said opening hinged on said outer wall, of a trough provided on the inner side of said door along its top and ends and terminating at the lower edge of the door adjacent its opposite ends.

2. In a body for a vehicle having a side portion, the combination with a compartment incorporated in said side portion, the outer wall of the side portion being formed with an opening leading into said compartment and a door for said opening hinged on said outer wall, of a trough provided on the inner side of said door along its top and ends and terminating at the lower edge of the door adjacent its opposite ends, and a baffle carried by said outer wall on the inner side thereof along the top and sides of said opening, whereby said baffle extends over the open side of said trough throughout its entire length.

3. In a body for a vehicle having a side portion, the combination with a compartment incorporated in said side portion, the outer wall of the side portion being formed with an opening leading into said compartment and a door for said opening hinged on said outer wall, of a trough provided on the inner side of said door along its top and ends and terminating at the lower edge of the door adjacent its opposite ends, and a baffle carried by said outer wall on the inner side thereof along the top and sides of said opening, whereby said baffle extends over the open side of said trough throughout its entire length, that portion of the baffle extending along the sides of the opening being extended inwardly behind the inner side wall of the trough.

4. A body for a vehicle having a side portion in which is incorporated a compartment, said side portion having a sheet metal outer wall formed with an opening leading into said compartment, and a door for said opening hinged at its lower edge, said outer wall above and along the top of said opening being extended to form a guard wall spaced from the door and embossed between said guard wall and the normal plane of said outer wall to form an inverted channel related to the top edge of said door to form a space between the door and terminating edge of said guard wall.

5. A body for a vehicle having a side portion in which is incorporated a compartment, the outer wall of said side portion being formed with an opening leading into said compartment, a hinged door for said opening formed of sheet metal having extended portions which are bent back on the inner side of the door and shaped to form a collecting trough extending along the top and ends of the door, and a baffle carried by said outer wall along the top and sides of said opening and extending over the open side of said trough throughout its entire length.

6. A body for a vehicle having a side portion in which is incorporated a compartment, the said side portion having a sheet metal outer wall formed with an opening leading into said compartment, and a door hinged at one edge on said outer wall and consisting of a sheet metal panel the top and ends of which are extended and bent back on the inner side of the door and extended inwardly and terminating in a baffle spaced from the inner side of the door in parallel relation thereto, the sheet metal forming said opening being extended inwardly thereof to a position beyond said baffle.

7. In a body for a vehicle having a side portion, the combination with a compartment incorporated in said side portion, the outer wall of said side portion being formed with an opening leading into said compartment and a hinged door for said opening formed of sheet metal, of a reinforcement for the door on the inner side thereof and extending along and parallel to its top edge and end edges, and a continuous channel forming a trough extending along the outer side of said reinforcement in relation to the top and end edges of the door to collect water leaking through said opening when the door is closed.

8. In a body for a vehicle having a side portion, the combination with a compartment incorporated in said side portion, the outer wall of the side portion being formed with an opening leading into said compartment and a door for said opening hinged on said outer wall, of a trough provided on the inner side of said door along its top and ends and terminating at the lower edge of the door adjacent the opposite ends thereof, a baffle carried by said outer wall on the inner side thereof and extending over the open side of said trough, and a collection trough on the inner side of said outer wall adjacent to and extending along the lower edge of said door.

9. In a body for a vehicle having a side portion, the combination with a compartment incorporated in said side portion, the outer wall of the side portion being formed with an opening leading into said compartment and a door for said opening hinged on said outer wall, of a trough provided on the inner side of said door along its top and ends and terminating at the lower edge of the door adjacent the opposite ends thereof, a baffle carried by said outer wall on the inner side thereof and extending over the open side of said trough, that portion of the baffle extending along the sides of the opening being extended inwardly behind the inner side wall of the trough, and a collector on the inner side of said outer wall adjacent to and extending along the lower edge of said door.

10. In a body for a vehicle having a side portion, the combination with a compartment incorporated in said side portion, the outer wall of said side portion being formed with an opening leading into said compartment and a door for said opening hinged along one edge to said outer wall, of an outwardly extending wall provided on said door along its upper edge to form a baffle, and an inverted channel mounted on said outer wall and extending along the upper edge of said opening, the inner wall of said channel being related to the outer edge of the said outwardly extending wall on said door.

11. In a body for a vehicle having a side portion, the combination with a compartment incorporated in said side portion, the outer wall of said side portion being formed with an opening leading into said compartment and a door for said opening hinged along one edge to said outer wall, of an outwardly extending wall provided on said door along its upper edge to form a baffle, an inverted channel mounted on said outer wall and extending along the upper edge of said opening, the inner wall of said channel being related to the outer edge of the said wall outwardly extending on said door, a trough on the inner side of said door and extending along and inwardly of its stop and end edges, and a collector on the inner side of said outer wall and extending along the lower wall of said door opening.

12. In a body for a vehicle having a side portion, the combination with a compartment incorporated in said side portion, the outer wall of said side portion being formed with an opening leading into said compartment and a hinged door for said opening, of a continuous channel forming a trough on the inner side of said door and extending along and inwardly of the top and end edges thereof, walls on the inner side of said outer wall extending across the open side of those portions of said trough along the ends of said door and extending inwardly behind the inner wall of said trough, and a collector on the inner side of said outer wall extending along the bottom wall of said door opening.

13. In a body for a vehicle having a side portion, the combination with a compartment incorporated in said side portion, the outer wall of said side portion being formed with an opening leading into said compartment and a hinged door for said opening provided along its upper edge with an outwardly extending baffle, of an inverted channel on the outer wall of said side portion above the opening therein, the inner wall of said channel being related to the free edge of said baffle.

14. A body for a vehicle having a side portion in which is incorporated a compartment, the outer wall of said side portion being formed with an opening leading into said compartment, a hinged door for said opening, the outer wall of said side portion above said door opening being extended outwardly and terminating in a downwardly extending section spaced from and parallel to the adjacent edge of said door and a separate, vertically disposed wall on the inner side of said outer wall having its lower edge terminating along and adjacent to the upper edge of said door.

15. A body for a vehicle having a side portion in which is incorporated a compartment, the outer wall of said side portion being formed with an opening leading into said compartment, a hinged door for said opening, the upper edge of said door being provided with an outwardly extending flange forming a baffle and said outer wall having a portion above said door opening extended laterally and terminating in a vertically disposed section spaced from the free edge of said flange, and a separate wall on the inner side of said outer wall disposed vertically and terminating along and adjacent the free edge of said flange.

16. A body for a vehicle having a side portion in which is incorporated a compartment, the outer wall of said side portion being formed with an opening leading into said compartment and a hinged door for said opening, provided along its top edge with an outwardly extending baffle.

PAUL E. HAWKINS.